US012723783B2

(12) United States Patent
Mehta et al.

(10) Patent No.: US 12,723,783 B2
(45) Date of Patent: Sep. 1, 2026

(54) SYSTEM AND METHOD FOR MAKING A BUILDING CARBON NEUTRAL

(71) Applicant: Carrier Corporation, Palm Beach Gardens, FL (US)

(72) Inventors: Rohan Ajinkya Mehta, Hyderabad (IN); Venkata Satya Pratap Kumar Dunna, New Hafeezpet (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 267 days.

(21) Appl. No.: 18/492,388

(22) Filed: Oct. 23, 2023

(65) Prior Publication Data

US 2024/0142142 A1 May 2, 2024

Related U.S. Application Data

(60) Provisional application No. 63/419,518, filed on Oct. 26, 2022.

(51) Int. Cl.

*F25B 9/00* (2006.01)
*B01D 53/26* (2006.01)
*F17C 5/00* (2006.01)

(52) U.S. Cl.

CPC .............. *F25B 9/008* (2013.01); *B01D 53/26* (2013.01); *F17C 5/00* (2013.01); *B01D 2221/02* (2013.01); *B01D 2257/504* (2013.01); *F17C 2221/013* (2013.01); *F17C 2227/041* (2013.01); *F17C 2227/046* (2013.01); *F25B 2309/06* (2013.01); *F25B 2400/23* (2013.01)

(58) Field of Classification Search

CPC ........ F25B 9/008; F25B 19/00; F25B 19/005; F25B 2309/06; F25B 2400/23; B01D 53/26; B01D 2221/02; B01D 2221/16; B01D 2257/504; B01D 53/1475; B01D 2256/22; F17C 2221/013; F17C 5/00; F17C 2227/041; F17C 2227/046

See application file for complete search history.

(56) References Cited

U.S. PATENT DOCUMENTS

2019/0193019 A1* 6/2019 Okano .................... F24F 8/125
2023/0036635 A1* 2/2023 Santos-Heard .......... B01J 20/20
2023/0356813 A1* 11/2023 Hutchinson ............ F25J 1/0027

FOREIGN PATENT DOCUMENTS

JP 5627870 B2 * 11/2014

OTHER PUBLICATIONS

English translation of Okano (JP 5627870 B2). (Year: 2014).*

(Continued)

*Primary Examiner* — Miguel A Diaz
(74) *Attorney, Agent, or Firm* — CANTOR COLBURN LLP

(57) ABSTRACT

An open loop cooling apparatus is provided. The open loop cooling apparatus includes gas capturing and collecting elements, an expansion valve receptive of pressurized gas from the gas capturing and collecting elements and configured to expand the pressurized gas, an evaporator coil downstream from the expansion valve through which the pressurized gas, having been expanded in the expansion valve, passes to cool air flowing over the evaporator coil and one or more storage tanks receptive of the pressurized gas from the evaporator coil for later sale.

12 Claims, 4 Drawing Sheets

(56) References Cited

OTHER PUBLICATIONS

"Evaporative Cooler Market Size And Forecast" Verified Market Research; Jan. 2023 <URL: https://www.verifiedmarketresearch.com/product/evaporative-cooler-market/> Accessed Oct. 23, 2023 (8 pages).

<URL: https://www.noya.co/> Noya; Accessed Oct. 23, 2023 (5 pages).

* cited by examiner

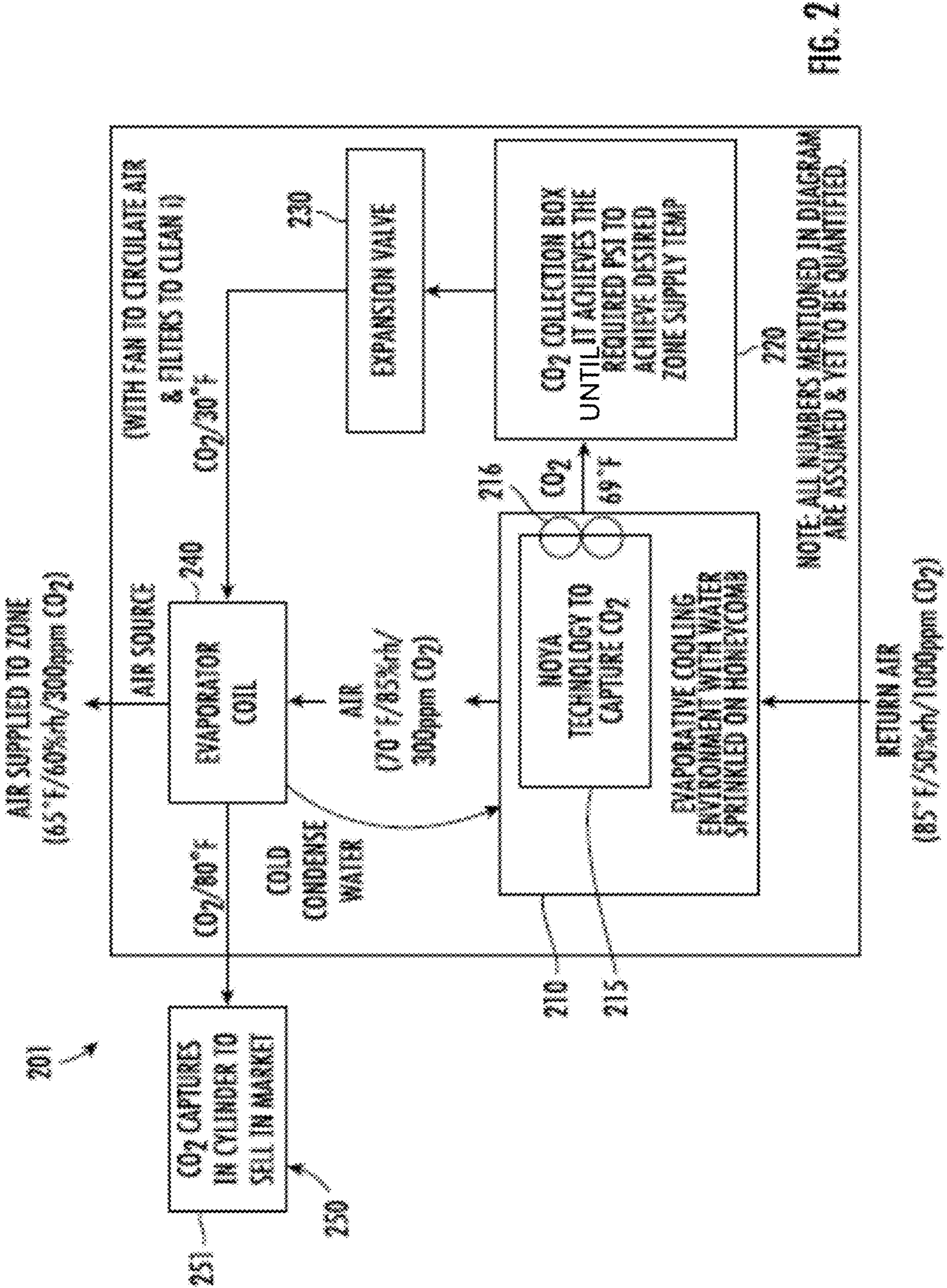
FIG. 2
201
$CO_2$ CAPTURES IN CYLINDER TO SELL IN MARKET
250
251
AIR SUPPLIED TO ZONE (65°F/60%rh/300ppm $CO_2$)
AIR SOURCE
240
EVAPORATOR COIL
$CO_2$/80°F
COLD CONDENSE WATER
AIR (70°F/85%rh/300ppm $CO_2$)
(WITH FAN TO CIRCULATE AIR & FILTERS TO CLEAN I)
$CO_2$/30°F
230
EXPANSION VALVE
$CO_2$ COLLECTION BOX UNTIL IT ACHIEVES THE REQUIRED PSI TO ACHIEVE DESIRED ZONE SUPPLY TEMP
220
216
$CO_2$
69°F
NOYA TECHNOLOGY TO CAPTURE $CO_2$
EVAPORATIVE COOLING ENVIRONMENT WITH WATER SPRINKLED ON HONEYCOMB
210
215
RETURN AIR (85°F/50%rh/1000ppm $CO_2$)
NOTE: ALL NUMBERS MENTIONED IN DIAGRAM ARE ASSUMED & YET TO BE QUANTIFIED.

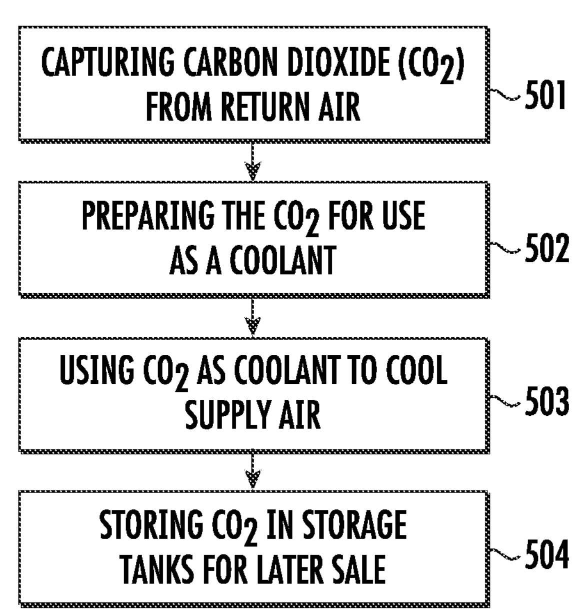
FIG. 5

SYSTEM AND METHOD FOR MAKING A BUILDING CARBON NEUTRAL

CROSS-REFERENCE TO RELATED APPLICATIONS

This application claims the benefit of U.S. Provisional Application No. 63/419,518 filed Oct. 26, 2022, the disclosure of which is incorporated herein by reference in its entirety.

BACKGROUND

The following description relates to air-handling systems and, more specifically, to methods and systems for making a building carbon neutral using open loop carbon dioxide ($CO_2$) cooling.

Air-handling systems are deployed in buildings to condition interior spaces in those buildings and can include air-handling units (AHUs), rooftop units (RTUs), unit ventilators (UVs), single zone units (SZUs), fan coil units (FCUs), etc. On hot days, typical systems cool the interior spaces to a lower set point temperature, shut down for a while, and then restart cooling once temperatures of the interior spaces increase to an upper set point temperature due to thermal flow between the interior spaces and ambient conditions outside. This process can continue over multiple cycles. On cold days, the typical systems operate similarly. They heat the interior spaces to an upper set point temperature, shut down for a while, and then restart heating once temperatures of the interior spaces decrease to a lower set point temperature due to thermal flow between the interior spaces and ambient conditions outside. This process can also continue over multiple cycles.

A building in which an air-handling system is deployed and in which humans occupy space, such as a commercial building or a residential building, can be considered a carbon dioxide ($CO_2$) factory. In these cases, $CO_2$ available from building exhaust is often present in concentrations that are more than twice that of ambient air. Conventional HVAC systems do not use this $CO_2$ and it is exhausted to the atmosphere. This effectively increases the building's $CO_2$ emission levels.

BRIEF DESCRIPTION

According to an aspect of the disclosure, an open loop cooling apparatus is provided. The open loop cooling apparatus includes gas capturing and collecting elements, an expansion valve receptive of pressurized gas from the gas capturing and collecting elements and configured to expand the pressurized gas, an evaporator coil downstream from the expansion valve through which the pressurized gas, having been expanded in the expansion valve, passes to cool air flowing over the evaporator coil and one or more storage tanks receptive of the pressurized gas from the evaporator coil for later sale.

In addition to one or more of the features described herein, or as an alternative, further embodiments may include an evaporative cooling environment including a honeycomb feature.

In addition to one or more of the features described herein, or as an alternative, in further embodiments the gas includes carbon dioxide ($CO_2$).

In addition to one or more of the features described herein, or as an alternative, in further embodiments the gas is pressurized within the gas capturing and collecting elements.

In addition to one or more of the features described herein, or as an alternative, in further embodiments water drawn out of the gas by the evaporator coil is directed to the gas capturing and collecting elements.

In addition to one or more of the features described herein, or as an alternative, in further embodiments each of the one or more storage tanks is a cylinder.

In addition to one or more of the features described herein, or as an alternative, in further embodiments the one or more storage tanks are plural and filled in parallel.

In addition to one or more of the features described herein, or as an alternative, in further embodiments the one or more storage tanks are plural and filled in series.

According to an aspect of the disclosure, an open loop cooling apparatus which is receptive of return air from an air handler of a building and which is configured to direct supply air back to the air handler is provided. The open loop cooling apparatus includes an evaporative cooling environment into which the return air is directed and including a gas capturing element to capture and cool gas from the return air, a gas collector receptive of cooled gas from the gas capturing element, an expansion valve receptive of pressurized gas from the gas collector and configured to expand the pressurized gas, an evaporator coil downstream from the expansion valve through which the pressurized gas, having been expanded in the expansion valve, passes to cool the supply air flowing over the evaporator coil and one or more storage tanks receptive of the pressurized gas from the evaporator coil for later sale.

In addition to one or more of the features described herein, or as an alternative, in further embodiments the evaporative cooling environment includes a honeycomb feature.

In addition to one or more of the features described herein, or as an alternative, in further embodiments the gas includes carbon dioxide ($CO_2$).

In addition to one or more of the features described herein, or as an alternative, in further embodiments the gas received by the gas collector from the gas capturing element is pressurized within the gas collector.

In addition to one or more of the features described herein, or as an alternative, in further embodiments water drawn out of the gas by the evaporator coil is directed to the evaporative cooling environment.

In addition to one or more of the features described herein, or as an alternative, in further embodiments each of the one or more storage tanks is a cylinder.

In addition to one or more of the features described herein, or as an alternative, in further embodiments the one or more storage tanks are plural and filled in parallel.

In addition to one or more of the features described herein, or as an alternative, in further embodiments the one or more storage tanks are plural and filled in series.

According to an aspect of the disclosure, an open loop cooling method is provided and includes capturing carbon dioxide ($CO_2$) from return air, preparing the $CO_2$ for use as a coolant, using the $CO_2$ as the coolant to cool supply air and storing the $CO_2$ in storage tanks for later sale.

In addition to one or more of the features described herein, or as an alternative, in further embodiments the return air is received from an air handler and the supply air is to be supplied to the air handler.

In addition to one or more of the features described herein, or as an alternative, in further embodiments the preparing of the $CO_2$ for use as a coolant includes collecting the $CO_2$, pressurizing the $CO_2$ and expanding the $CO_2$.

In addition to one or more of the features described herein, or as an alternative, in further embodiments the method further includes directing water, which is generated by the using of the $CO_2$ as the coolant to cool the supply air, to an evaporative cooling environment for capturing the $CO_2$.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 2 is a schematic diagram illustrating an open-loop cooling apparatus of an air-handling system in accordance with embodiments;

FIG. 5 is a flow diagram illustrating a method of operating an open-loop cooling apparatus in accordance with embodiments.

These and other advantages and features will become more apparent from the following description taken in conjunction with the drawings.

DETAILED DESCRIPTION

As will be described below, air with high $CO_2$ content that is exhausted from a commercial building is sent to a cooling tower through a duct. Whereas normally the exhaust of this cooling tower would be air with high water ($H_2O$) and $CO_2$ content, it is reused and fed to an air-handling unit (AHU), which can also be referred to as a rooftop unit (RTU), a unit ventilator (UV), a single zone unit (SZU), a fan coil unit (FCU), etc. (hereinafter the phrase "air-handling system" or "air-handling unit" or their equivalents will be used to cover all of these options collectively). The AHU will generate output air with less $H_2O$, less $CO_2$ and more oxygen ($O_2$). The duct can act like heat exchanger prior to feeding the air to the AHU. In some cases, the AHU will generate hydrocarbon (HC) fuel as a source of energy that can be sold in market.

In addition, return or exhaust air is received from a space within a building at about 85° F., 50% rh, 1000 ppm $CO_2$ via an AHU and is fed to an evaporative cooling device developed with $CO_2$ capture technology. Air at about 69° F., 85% rh, 300 ppm $CO_2$ that is output from this device will be fed to a $CO_2$ collector. This $CO_2$ will be forced through an expansion valve to reduce the $CO_2$ temperature and then will be passed through an evaporator coil. Air to be resupplied to the space at about 65° F., 60% rh, 300 ppm $CO_2$ will be cooled within the evaporator coil. Finally, the $CO_2$ will be collected in cylinders to be sold later. This will reduce $CO_2$ generated and exhausted by the building. As a compressor will not be required, energy consumption of the building will be reduced. Also, condensed water from evaporator coil will be fed back to the evaporative cooling device, which will reduce water needs.

Figure 1:
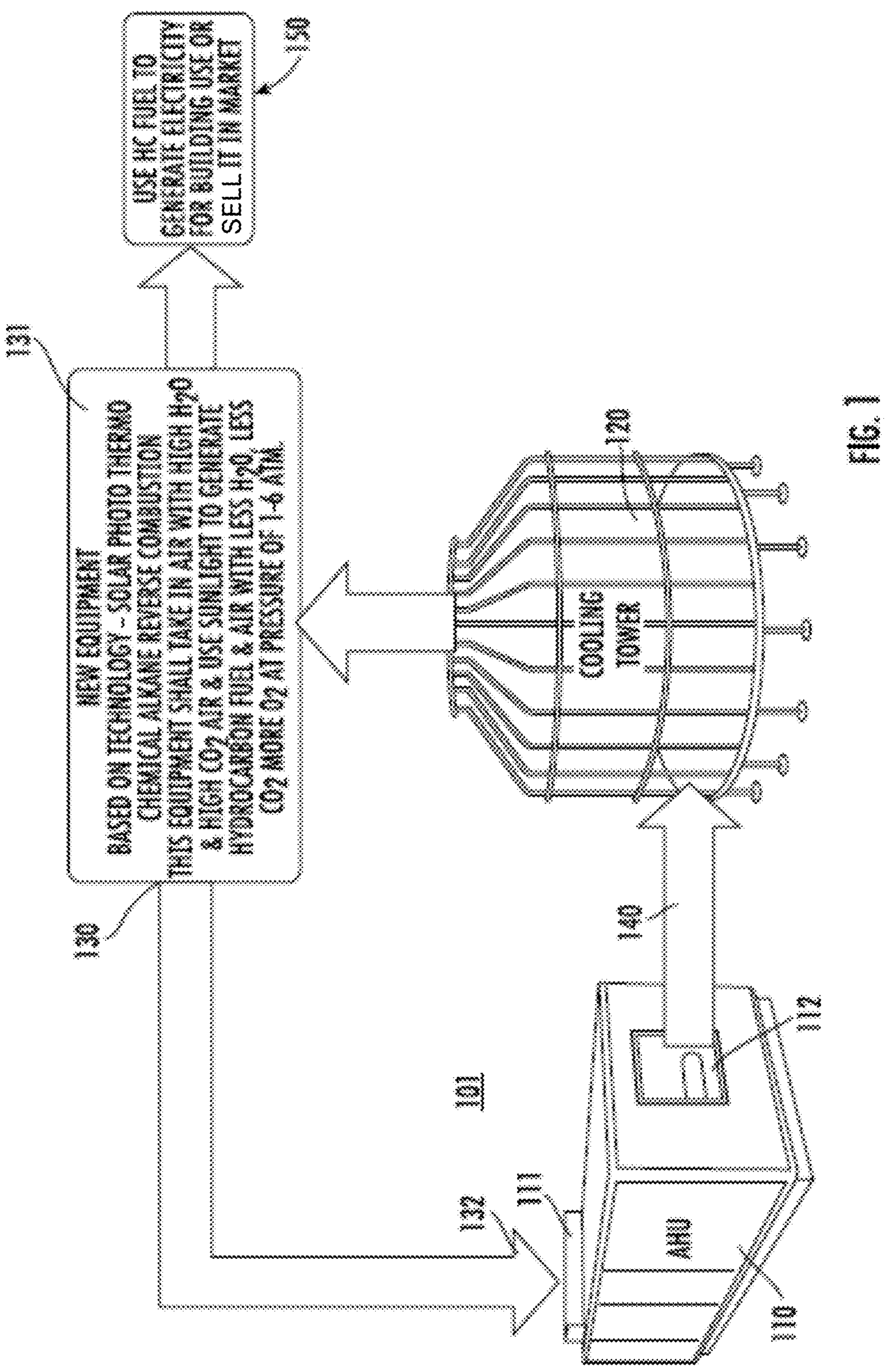
FIG. 1 is a schematic diagram illustrating an air-handling system in accordance with embodiments.

With reference to FIG. 1, an air-handling system 101 of a building is provided. The air-handling system 101 includes an AHU 110 that outputs exhaust air with relatively high $CO_2$ content, a cooling tower 120 and a duct 130. The cooling tower 120 is receptive of the exhaust air from the AHU 110 and is configured to cool water in the exhaust air and to output exhausted air with the relatively high $CO_2$ content and relatively high water content. The duct 130 is receptive of the exhausted air from the cooling tower 120 and includes an air-conversion element 131. The air-conversion element 131 is configured to use sunlight or another energy source to convert the exhausted air into fuel, such as hydrocarbon fuel, and air with relatively low $CO_2$ and water content and relatively high oxygen ($O_2$) content. An outlet 132 of the duct 130 is configured to direct the air into an inlet 111 of the AHU 110.

The air-handling system 101 can further include an intermediate duct 140 by which the exhaust air from the AHU 110 is directed from an outlet 112 of the AHU 110 to the cooling tower 120. In some cases, the air-handling system 101 can further include a storage system 150 for storing and packaging the fuel which is produced by the air-conversion element 131. A $CO_2$ storage system (see FIG. 3) can also be provided for storing and packaging $CO_2$ that is drawn from the cooling tower 120.

In accordance with embodiments, the exhaust air with the relatively high $CO_2$ content, which is output from the AHU 110, can have a $CO_2$ content that is higher than ambient air and may be higher than 700 ppm. The exhausted air with the relatively high $CO_2$ content and the relatively high water content, which is exhausted from the cooling tower 120, can have a $CO_2$ content that is higher than ambient air and may be higher than 700 ppm and a water content above about 30 $gm/m^3$. The air with the relatively low $CO_2$ and water content and the relatively high $O_2$ content, which is produced by the air-conversion element 131, can have a pressure of about 1-6 atm.

With reference to FIG. 2, one or both of the cooling tower 120 and the air conversion element 131 can be replaced with an open loop $CO_2$ cooling apparatus 201. The open loop $CO_2$ cooling apparatus 201 includes an evaporative cooling environment 210 including a $CO_2$ capturing element 215, a collection body 220 for pressurizing gas therein, an expansion valve 230, an evaporator coil 240 downstream from the expansion valve 230 and a storage assembly 250. The evaporative cooling environment 210 is receptive of return or exhaust air from the AHU 110 of FIG. 1 with the relatively high $CO_2$ content (i.e., exhaust air at about 85° F., 50% rh and 1,000 ppm $CO_2$) and can include or be provided with a honeycomb feature on which cold condensed water to be described below is sprinkled from the evaporator coil 240. The $CO_2$ capturing element 215 is configured to capture and slightly cool $CO_2$ from the exhaust air within the evaporative cooling environment 210. The captured $CO_2$ will then be directed (i.e., by a pump or blower 216) to the collection body 220 at about 69° F. until the $CO_2$ within the collection body 220 achieves a required pressure to achieve a desired zone supply temperature. The pressurized $CO_2$ will then be directed through the expansion valve 230 in which the pressurized $CO_2$ is expanded and cooled whereupon the $CO_2$ at about 30° F. is directed to the evaporator coil 240. The pressurized $CO_2$ is passed through the evaporator coil 240 and air is blown over the evaporator coil 240. This cools the air to about 65° F., 60% rh, 300 ppm $CO_2$ so that the air can be returned to the AHU 110 of FIG. 1. Cold condensed water can be drawn out from the evaporator coil 240 for use in the honeycomb feature of the evaporative cooling environment 210.

The $CO_2$ exiting the evaporator coil 240 at about 80° F. can be collected in storage tanks or cylinders 251 of the storage assembly 250. As these storage tanks or cylinders 251 are filled, they can be taken and sold on the market as a primary or secondary revenue stream for a user.

Figure 3:
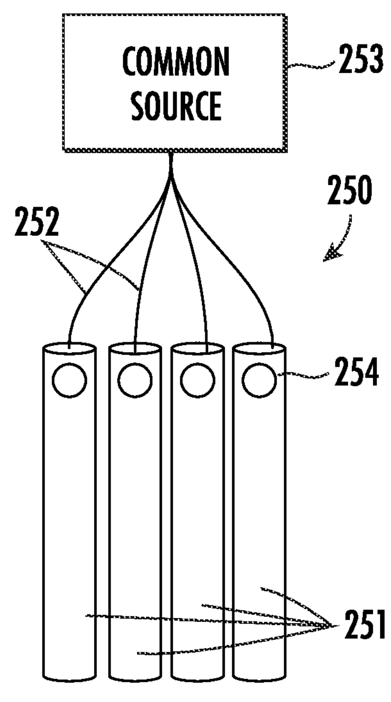
FIG. 3 is a schematic illustration of storage tanks in parallel in accordance with embodiments.
Figure 4:
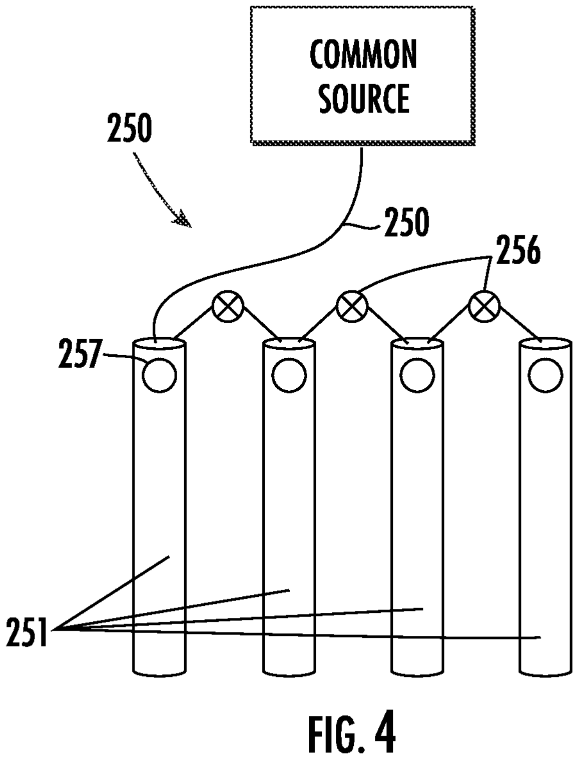
FIG. 4 is a schematic illustration of storage tanks in series in accordance with embodiments.

With continued reference to FIG. 2 and with additional reference to FIGS. 3 and 4, the storage assembly 250 is configured to supply the $CO_2$ exiting the evaporator coil 240 (see FIG. 2) to each of the storage tanks or cylinders 251 in parallel (see FIG. 3) or the storage tanks or cylinders 251 in series (see FIG. 4) when there are plural storage tanks or cylinders 251. In the former case, each storage tank or cylinder 251 is connected to a line 252 that is fed from a common source 253, which is fluidly coupled to the evaporator coil 240, so that each of the storage tanks or cylinders 251 is filled in parallel at the same time. Sensors or pressure gauges 254 may be disposed on each of the storage tanks or cylinders 251 to determine when they are filled and to issue an alert to the user as to their filled state. In the latter case, each storage tank or cylinder 251 is connected to a common line 255, which is fluidly coupled to the evaporator coil 240, and which includes a series of check valves 256 between each of the storage tanks or cylinders 251 so that each of the storage tanks or cylinders 251 is filled sequentially in series. Sensors or pressure gauges 257 may be disposed on each of the storage tanks or cylinders 251 to determine when they are filled and to issue an alert to the user as to their filled state.

With reference to FIG. 5, an open loop cooling method 500 is provided and includes capturing carbon dioxide (CO 2) from return air at block 501, preparing the $CO_2$ for use as a coolant at block 502, using the $CO_2$ as the coolant to cool supply air at block 503 and storing the $CO_2$ in storage tanks for later sale at block 504. In accordance with embodiments, the return air is received from an air handler and the supply air is to be supplied to the air handler. Also, the preparing of the $CO_2$ for use as a coolant of block 502 includes collecting the $CO_2$, pressurizing the $CO_2$ and expanding the $CO_2$. In addition, the method can include directing water, which is generated by the using of the $CO_2$ as the coolant to cool the supply air, to an evaporative cooling environment for capturing the $CO_2$.

Technical effects and benefits of the present disclosure are the provision of new technology to help limit global warming by removing $CO_2$ from air that is exhausted from a building and to generate fuel and $O_2$. Air is exhausted out of this new equipment with less $H_2O$, reduced $CO_2$ (<400 ppm) and more $O_2$ that can be used in the AHU. Hydrocarbon fuel can also be generated as a good source of energy in, for example, the generation of electricity by a generator for building usage. In addition, the open loop $CO_2$ cooling apparatus requires no conventional compressor so that it has a reduced power requirement, condensed water will be reused and $CO_2$ will be used for cooling before being sold.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An open loop cooling apparatus, comprising:

gas capturing and collecting elements configured for and capable of capturing and cooling gas from the return air, wherein the gas comprises carbon dioxide;

an expansion valve receptive of pressurized gas from the gas capturing and collecting elements and configured to expand the pressurized gas;

an evaporator coil downstream from the expansion valve through which the pressurized gas, having been expanded in the expansion valve, passes as expanded and de-pressurized gas to cool air flowing over the evaporator coil; and plural storage tanks receptive of the expanded and de-pressurized gas from the evaporator coil for later sale, wherein each of the plural storage tanks is a cylinder, the plural storage tanks are filled in series at corresponding respective ends thereof and the open loop cooling apparatus further comprises:

check valves between each of the plural storage tanks; and pressure gauges disposed on each of the plural storage tanks at the corresponding respective ends thereof to determine when the plural storage tanks are filled and to issue an alert as to a filled state of the plural storage tanks.

2. The open loop cooling apparatus according to claim 1, wherein the gas capturing and collecting elements comprise an evaporative cooling environment comprising a honeycomb feature.

3. The open loop cooling apparatus according to claim 1, wherein the gas is pressurized within the gas capturing and collecting elements.

4. The open loop cooling apparatus according to claim 1, wherein water drawn out of the gas by the evaporator coil is directed to the gas capturing and collecting elements.

5. An open loop cooling apparatus which is receptive of return air from an air handler of a building and which is configured to direct supply air back to the air handler, the open loop cooling apparatus comprising:

an evaporative cooling environment into which the return air is directed and comprising a gas capturing element configured for and capable of capturing and cooling gas from the return air, wherein the gas comprises carbon dioxide;

a gas collector receptive of cooled gas from the gas capturing element;

an expansion valve receptive of pressurized gas from the gas collector and configured to expand the pressurized gas;

an evaporator coil downstream from the expansion valve through which the pressurized gas, having been expanded in the expansion valve, passes as expanded and de-pressurized gas to cool the supply air flowing over the evaporator coil; and plural storage tanks receptive of the expanded and depressurized gas from the evaporator coil for later sale, wherein each of the plural storage tanks is a cylinder, the plural storage tanks are filled in series at corresponding respective ends thereof and the open loop cooling apparatus further comprises:

check valves between each of the plural storage tanks; and pressure gauges disposed on each of the plural storage tanks at the corresponding respective ends thereof to determine when the plural storage tanks are filled and to issue an alert as to a filled state of the plural storage tanks.

6. The open loop cooling apparatus according to claim 5, wherein the evaporative cooling environment comprises a honeycomb feature.

7. The open loop cooling apparatus according to claim 5, wherein the gas received by the gas collector from the gas capturing element is pressurized within the gas collector.

8. The open loop cooling apparatus according to claim 5, wherein water drawn out of the gas by the evaporator coil is directed to the evaporative cooling environment.

9. An open loop cooling method, comprising:

capturing carbon dioxide ($CO_2$) from return air;

preparing the $CO_2$ for use as a coolant;

using the $CO_2$ as the coolant to cool supply air; and storing the $CO_2$ in plural storage tanks for later sale, wherein each of the plural storage tanks is a cylinder, the storing comprises filling the plural storage tanks in series at corresponding respective ends thereof and the open loop cooling method further comprises:

disposing check valves between each of the plural storage tanks; and determining, by pressure gauges disposed on each of the plural storage tanks at the corresponding respective ends thereof, when the plural storage tanks are filled and issuing an alert as to a filled state of the plural storage tanks.

10. The open loop cooling method according to claim 9, wherein the return air is received from an air handler and the supply air is to be supplied to the air handler.

11. The open loop cooling method according to claim 9, wherein the preparing of the $CO_2$ for use as a coolant comprises:

collecting the $CO_2$;

pressurizing the $CO_2$; and expanding the $CO_2$.

12. The open loop cooling method according to claim 9, further comprising directing water, which is generated by the using of the $CO_2$ as the coolant to cool the supply air, to an evaporative cooling environment for capturing the $CO_2$.

* * * * *